June 28, 1960

W. F. BERCK 2,942,497

AUTOMATIC TEMPERATURE COMPENSATOR

Filed July 30, 1956

INVENTOR.
WILLIAM F. BERCK
BY
Mellin and Hanscom
ATTORNEYS

June 28, 1960     W. F. BERCK     2,942,497
AUTOMATIC TEMPERATURE COMPENSATOR

Filed July 30, 1956     6 Sheets-Sheet 5

INVENTOR.
WILLIAM F. BERCK
BY
Mellin and Hanscom
ATTORNEYS

June 28, 1960  W. F. BERCK  2,942,497
AUTOMATIC TEMPERATURE COMPENSATOR
Filed July 30, 1956  6 Sheets-Sheet 6

INVENTOR.
WILLIAM F. BERCK
BY
Mellin and Hanscom
ATTORNEYS

# United States Patent Office 2,942,497
Patented June 28, 1960

2,942,497
AUTOMATIC TEMPERATURE COMPENSATOR

William F. Berck, Hayward, Calif., assignor to Ralph N. Brodie Company, San Leandro, Calif., a corporation of California Filed July 30, 1956, Ser. No. 600,888

2 Claims. (Cl. 74—691)

My invention relates to automatic temperature compensators, and, more specifically, to such compensators as are designed for use in the measuring of flow of liquids.

It is an object of my invention to provide an automatic temperature compensator for use with a liquid meter whereby the flow volume measured by the meter is automatically compensated for variations in the temperature of the liquid being metered.

A further object of the invention is to provide an automatic temperature compensator comprising an infinitely variable transmission, a means for varying the ratio of the input to the output speed of the transmission, thermally responsive elements to initiate the change of the input to output transmission ratio, and means to compensate for the ambient temperature so that the compensator will be unaffected by change in the ambient temperature.

A yet further object is to provide an automatic temperature compensator comprising an infinitely variable transmission, a means for varying the ratio of input to output speeds of the transmission, a thermally responsive element sensing the temperature of the liquid being metered to initiate the change in the transmission ratio, a thermally responsive means to compensate for changes in the ambient temperature whereby the compensator will be unaffected by change in the ambient temperature, and means to compensate for different coefficients of expansion of liquids being metered.

A further object is to provide an infinitely variable transmission for use in an automatic temperature compensator having an output shaft connected to a sun gear, a ring gear concentric to the sun gear and a planet gear in meshing engagement with the sun and ring gear, an input shaft adapted to directly drive the planet gear and individually adapted to drive the ring gear, and a means to vary the drive between the input shaft and the ring gear.

A further object of the invention is to provide a temperature responsive actuator for use in an automatic temperature compensator which is unaffected by changes in ambient temperature and which is capable of producing a movement proportional to movement produced by a temperature sensitive means responsive to the temperature of the liquid being metered.

A further object of my invention is to provide a temperature responsive actuator for use in an automatic temperature compensator wherein, by suitable linkage, the actuator is unaffected by change in ambient temperature, and wherein the actuator produces a movement proportional to movement produced by a temperature sensitive means responsive to the temperature of the liquid being metered, and whereby the proportionality of such movement may be adjusted to compensate for variations in the coefficient of expansion of the liquids being metered.

Other objects and advantages will become apparent in the detailed description to be hereinafter discussed.

In the United States most petroleum products are bought and sold, except at the retail level, on a basic temperature of 60° F., with the transfer of such products being commonly on a volume basis. However, most of the transfers of such products are made at temperatures other than 60° with the result that the volume of the products must be corrected to the accepted 60° temperature to obtain a standard volume. In addition, the response of different petroleum products to a change in temperature varies widely, depending upon the coefficient of expansion of the particular product. A series of Group Numbers has been assigned in the industry for convenience in determining the change in volume with temperature, based upon the coefficient of expansion per unit volume of liquid per degree of temperature change, as follows:

|           | Coefficient of expansion at 60° F. |
|-----------|------------------------------------|
| Group I   | .0004                              |
| Group II  | .0005                              |
| Group III | .0006                              |
| Group IV  | .0007                              |
| Group V   | .0008                              |
| Group VI  | .00085                             |
| Group VII | .0009                              |

However, to determine more accurately the corrected volume of a liquid, it is quite usual to discard the Group Number system and use coefficients of expansion which have been computed to the fifth decimal place.

It has long been recognized that the vast number of computations required from day to day to provide the 60° corrected volume of petroleum products transfers results in great cost as well as in numerous errors. It is highly desirable to secure these results automatically.

I have invented an improved automatic temperature compensator for use with a positive displacement fluid meter whereby the volume indicator of the fluid meter is connected to the compensator and an automatic compensation is provided so that the output of the compensator will be adjusted automatically to correct to a 60° volume. The compensator is also capable of being adjusted for different degrees of coefficients of expansion so that when so adjusted for a particular fluid a corrected volume indication will be automatically obtained even though the temperature of the fluid being metered may fluctuate through wide temperature differences.

In the accompanying drawings, forming a part of this application, and in which like numerals are employed to designate like parts throughout the same.

In terms of broad inclusion, the temperature compensator comprises an infinitely variable transmission in which the ratio of drive from input to output is varied proportionally to changes in the temperature of the liquid being metered, the degree of proportionality being capable of adjustment to compensate for the particular coefficient of expansion of the liquid being metered.

The changes in temperature of the metered liquid are automatically sensed by a thermostatic bulb, immersed in the liquid. The expansion of the liquid in the bulb is utilized to move a primary bellows, this movement, in turn, being transferred through an appropriate linkage to an infinitely variable friction member which changes the ratio of the transmission drive in accordance with the coefficient of expansion of the liquid being metered.

Ambient temperatures, which might result in error, are automatically cancelled by a secondary bellows responsive only to atmospheric temperature.

In greater detail, reference numeral 10 generally indicates a housing having formed therethrough at the bottom and top side thereof axially aligned bores 11 and 12, respectively. An input shaft 13 is mounted for rotation in anti-friction bearing 14 secured in bore 11. A coupling shaft 15 enables the input shaft 13 to be coupled to the volume indicator output shaft of a positive displacement liquid meter, of a type as illustrated in my prior patent, U.S. Patent No. 2,531,603.

Fixed to input shaft 13 is a drive gear 16, having twenty-two teeth, in meshing engagement with gear 17, having forty teeth. Gear 18, having twenty teeth, is compounded to gear 17 and fixed to shaft 19, journaled for free rotation in housing 10. Gear 18 is in meshing engagement with gear 21, having forty teeth, mounted for rotation around the output shaft 22. Gear 21 also serves as the hub and planet arm for a planetary system in which planet gears 23 and 24, mounted on shafts 26 and 27, respectively, carried by planet arm 28, mesh with the inner teeth 29 of ring gear 30, having forty-eight inner teeth, to drive the output sun gear 32, having sixteen teeth. The sun gear 32 is journaled for rotation in anti-friction bearing 33 mounted in bore 12 of housing 10, and fixed to output shaft 22. An output coupling 34 enables the output shaft to be connected to a conventional counting, or indicating, mechanism (not shown), whereby the number of revolutions of the output shaft may be recorded.

In a planetary system of the type described, the ratio of drive with the planet arm driving and the sun gear driven is expressed as $$\frac{R+S}{S}$$

in which $R$=number of inner teeth of the ring gear 30, and $S$=number of teeth of the output sun gear. The overall drive ratio from input to output of the compound gear train described is thus equal to $$\frac{\text{gear }16}{\text{gear }17} \times \frac{\text{gear }18}{\text{gear }21} \times \frac{R+S}{S}$$

Substituting the known number of teeth in each gear, we have $$\frac{22}{40} \times \frac{20}{40} \times \frac{48+16}{16} = \frac{1.1}{1}$$

or, for each revolution of the input shaft 13, the output shaft turns through 1.1 revolutions.

Compounded to gear 16, and thus driven by the input shaft 13, is a second gear 36, having forty teeth, in meshing engagement with a platform gear 37, having forty teeth, journaled for rotation in anti-friction bearing 38, mounted in housing 10.

A friction roller 39, having a spline 41a, is mounted on shaft 41, with the spline 41a slidably received within a longitudinal groove 41b formed in the shaft 41, thus allowing the friction roller 39 to move longitudinally along the shaft while coupling the roller and shaft against relative rotation. The shaft 41 is disposed above the platform gear 37 so that the projected axis of the platform gear passes through the center of shaft 41. The friction roller has a circular friction surface 43 held in contact with the upper surface 44 of the platform gear 37, the friction surface 43 being formed with a 5/8 inch outside diameter. Therefore, when the friction surface 43 is bearing on the platform gear at a radial distance of 5/16 inch from the center of the platform gear, the ratio of drive from the platform gear to the friction roller is one to one.

The friction roller shaft 41 is journaled in anti-friction bearing 46 mounted within slots 47, formed in stanchions 48 and 49. The slots 47 prevent horizontal movement of the bearing 46 while allowing vertical movement of the bearing in the slots. A retainer plate 51, vertically slidably mounted on studs 52 and 53 formed on the upper ends of stanchions 48 and 49, engages the upper surface of bearing 46, while spring 54 urges the plate 51 downwardly to force the friction surface 43 of the friction roller 39 into engagement with the upper surface 44 of the platform gear 37. The other end of the shafts 41 is mounted in a similar manner, with retainer plate 56 being urged downwardly by spring 57.

A roller positioning slide 58 is slidably mounted above the retainer plates 51 and 56, with a stud 59 on the retainer plate 51 passing through a longitudinal slot 61. A downwardly directed stud 62 mounted on slide 58 fits within a groove 63 found in the friction wheel 39, and an upwardly directed stud 64 passes through opening 65a in actuating lever 65.

It is thus seen that if the actuating arm is moved in a horizontal direction, that the stud 62 will cause the friction roller 39 to move axially thereof along shaft 41 in a direction radially of the platform gear 37, with the rotation of the platform gear being transferred to the friction roller and shaft 41.

Mounted on one end of the shaft 41 is a worm 66, having two teeth, in meshing engagement with worm wheel 67, having sixteen teeth, fixed to shaft 68, journaled to housing 10. Gear 69, having sixteen teeth, is also fixed to shaft 68, and is in driving engagement with the outer teeth 71 of ring gear 30, the ring gear having sixty outer teeth. The ring gear 30 is driven by the last described compound gear train in the same rotational direction as the sun gear 32.

Thus, presuming the planet arm 28 stationary, the input to ring gear 30 drive ratio of the last compound gear train described is equal to:

$$\frac{\text{gear }36}{\text{gear }37} \times \frac{\text{platform gear setting}}{\text{friction roller radius}}$$

$$\times \frac{\text{worm }66}{\text{worm wheel }67} \times \frac{\text{gear }69}{\text{ring gear }30}$$

Substituting the number of teeth of each gear and assuming the friction roller to be 5/16 inch from the center of the platform gear 37, the drive ratio is:

$$\frac{40}{40} \times \frac{5/16}{5/16} \times \frac{2}{18} \times \frac{18}{60} = \frac{1}{30}$$

or, for each revolution of the input shaft 13, the ring gear is driven through one-thirtieth of a revolution. In a planetary system, as described, the ratio of drive with the ring gear 30 driving, the planet arm 28 being held stationary, and the sun gear 32 driven is $R/S$, in which $R$= the number of inner teeth of the ring gear, and $S$=the number of teeth of the sun gear. Substituting the number of teeth, the ratio for ring gear 30 to sun gear 32 is $$\frac{48}{16} : \frac{3}{1}$$

or, each revolution of the ring gear equals three revolutions of the sun gear.

The friction roller 39 is designed to be moved radially of the platform gear with a minimum distance or platform setting of 2/16 inch from the center thereof, and a maximum distance of 8/16 inch from the center thereof, with a mean distance of 5/16 inch. With these platform settings, we may now determine the total effect of one revolution of the input shaft 13 to the output shaft 22 at the various platform settings, always presuming planet arm 28 is held stationary.

Minimum platform setting $$\frac{40}{40} \times \frac{2/16}{5/16} \times \frac{2}{18} \times \frac{18}{60} \times \frac{3}{1} = \frac{1}{25} = .04$$

Mean platform setting $\frac{40}{40} \times \frac{5/16}{5/16} \times \frac{2}{18} \times \frac{18}{60} \times \frac{3}{1} = \frac{1}{10} = .10$ Maximum platform setting $$\frac{40}{40} \times \frac{3/16}{5/16} \times \frac{2}{18} \times \frac{13}{60} \times \frac{3}{1} = \frac{4}{25} = .16$$

Combining these ratios with the ratio originally established as normal to this planetary system, or 1.1 revolutions of output for one revolution of input, we have as a total ratio of input to output:

At minimum platform setting __________ 1.1—0.4=1.06
At mean platform setting ____________ 1.1—.10=1.00
At maximum platform setting _________ 1.1—.16= .94

Thus, it is seen that with an eight-sixteenth of an inch of adjustment in the relation of the friction roller 39 to the center of the platform gear 37, there results a change of 12% (1.06—.94) in ratio between the input shaft 13 and the output shaft 22.

The temperature compensator design is based on a mean platform setting (5/16 inch) at 60° F., for it is at this setting that a ratio from input to output is one to one. The variable speed transmission thus described provides for a 6% of change in this ratio due to temperature below 60° F. and for 6% of change in this ratio due to temperature above 60° F.

The heat responsive means comprises a liquid filled bulb 72 placed in close juxtaposition with the liquid stream being metered, a capillary tube 73, connecting this bulb with a liquid filled bellows 74 having a stem 76 to provide a definite axial movement for each degree of temperature change in the liquid stream. This type of thermal responsive bulb and bellows assembly is well known and designed so that the expansion of the liquid in the bulb and bellows produces a usable movement and force. The particular configuration of the bulb, capillary tube and bellows and the particular type of fluid used to fill the bulb and bellows have no bearing on this invention, it being essential only that movement of the stem 76 per degree of temperature change of the fluid being metered be a designated amount suitable to the mechanism. In the device disclosed, one degree of temperature change in the liquid being metered results in .00125 of an inch movement in stem 76.

The bulb 72, being in close contact with the stream of liquid, accurately assumes the temperature of that stream and the liquid contained within the bulb expands at a predetermined rate at a rise in temperature and conversely contracts with a fall in temperature. The capillary tube 73, providing communication between the bulb and bellows, has a very fine diameter, and thus the amount of fluid contained in the tube is of no practical significance. The bellows, however, contains an appreciable quantity of fluid and since this bellows is subject to ambient temperatures, the liquid contained therein will expand and contract in relation to changes in the ambient temperature rather than to the changes in the liquid temperatures. The influence of ambient temperatures in this system results in an erroneous movement of stem 76 which must be corrected.

Bellows 77 is so made that its response to ambient temperatures exactly matches the response of bellows 74 to ambient temperatures. A linkage, described hereinafter, acts in a manner to cancel out the movement of bellows 74 and 77 in response to ambient temperature changes so that the position of friction roller 39 on platform gear 37 is affected solely by the temperature changes in the liquid stream as sensed by bulb 72.

Stem 76 bears against lever 78 at 79, causing lever 78 to pivot about stud 81 mounted on frame 80, the frame 80 being fixed to housing 10. Stem 82 bears against a similar lever 83 at 84, causing lever 83 to pivot about stud 86 mounted on frame 80.

If both bellows 74 and 77 are expanding due to rising ambient temperatures, lever 78 will be caused to rotate in a clockwise direction while lever 83 will be caused to rotate in a counterclockwise direction.

Levers 78 and 83, opposite pivot points 81 and 86, have slots 87 and 88 formed therethrough, respectively. A quadrilateral linkage or toggle system 90, having four equal length toggle links 91, 92, 93 and 94 pivotally connected to each other at each corner of the toggle system, has a pivot stud 89 pivotally connecting links 91 and 92 at one corner of the toggle system 90, and riding within slot 87 of lever 78, and a second pivot stud 96 pivotally connecting links 93 and 94 at the opposite corner of the toggle system 90, and riding within slot 88 of lever 83.

Cross link 97 incorporates slots 98 and 99 which cooperate with studs 89 and 96; cross link 97 also being provided with a stud 101 which rides in slot 102 of slide link 103. At one end slide link 103 is fixed by means of hole 104 to pivot stud 106 of toggle system 90; at the opposite end of slide link 103 a slot 107 guides the final pivot stud 108 in the toggle system, all these parts cooperating in such a manner that slide link 103 and studs 106 and 108 are always positioned along a line which is at right angles to a line passing through the center of studs 81 and 86.

A carrier bracket 109 has fixed to itself two studs 111 and 112 which slidably position cross link 97 in a parallel relationship to a line passing through pivot points 81 and 86 so that studs 89 and 96 are maintained at an equal distance from pivots 81 and 86, respectively.

In a toggle system such as 90, in which each link is free to pivot, if stud 89 and stud 96 are moved toward each other at an equal rate and an equal distance, the lateral relationship of studs 106 and 108 will be undisturbed but the distance between studs 106 and 108 will be lengthened. Thus, it will be seen that, if due to the effects of ambient temperature change bellows stem 76 and bellows stem 82 move the same distance at the same rate, levers 78 and 83 will rotate at an equal rate clockwise and counterclockwise, respectively, while studs 89 and 96, being positioned by cross slide 97 and carrier 109 at an equal distance from pivots 81 and 86, will move at an equal rate. Studs 106 and 108, being guided by slide link 103 and stud 101, will be undisturbed laterally but will move into a closer or farther relationship with each other along a line described by hole 104, slot 102 and slot 107, depending upon whether stems 76 and 82 are moving under the influence of a rising or a lowering temperature.

As described, under the influence of an ambient temperature change in bellows 74 and 77, the system of cooperating levers, links and toggles exactly absorbs this change without disturbing the lateral relationship of slide link 103 or toggle pivots 106 and 108.

Expansion of liquid in bulb 72 superimposes a movement of bellows 74 over and above any movement of this bellows caused by ambient temperature change so that position of bellows stem 76 is affected not only by the ambient temperature of bellows 74 but also by the temperature of the liquid stream which has created a temperature change in bulb 72 substantially different from ambient temperature.

This additional movement of stem 76 is not compensated for by a similar movement of stem 82; therefore, stud 96 of toggle system 90 remains stationary. This movement of stem 76 causes lever 78 to pivot about stud 81, moving stud 89 in a direct relationship. With stud 96 stationary, movement of stud 89 then causes studs 106, 108, slide link 103 and slot 102, stud 101, cross link 97 and stud 113 to be displaced laterally.

In a toggle system such as described, in which all four links are of equal length, if pivot 96 is held stationary and if pivot 89 is moved either toward pivot 96 or away from that point, then studs 106 and 108 will move exactly one half of that amount. To explain this, suppose toggle links 93 and 92 were two equal sides of an isosceles triangle with line 89—96 as a base. A perpendicular constructed to this base from apex 108 divides the base exactly in half; therefore, any increment of change in the length of line 89—96 will be reflected in just half that increment of movement on point 108 as well as point 106, slide link 103, cross link 97 and stud 113.

Stud 113 extends into slot 114 of lever 65, which is pivoted at 116 on fixed stud 117 mounted on base 80 and at its opposite end has a hole 65a which cooperates with stud 62 of roller positioning slide 58. Stud 62 in slide 58 riding in groove 63 of roller 39 causes the roller to be positioned in response to movement of slide 58 and lever 65.

Therefore, expansion or contraction of liquid in bellows 72 due to changes in temperature of a liquid stream superimposes a movement of bellows 74 and stem 76 other than that caused by ambient temperature and through the linkage described causes a movement of roller 39 on platform gear 37 which changes the ratio of drive between these points and, through an appropriate planetary gear system, causes a change of ratio between input 13 and output 22 of the temperature compensator.

In a device of this nature, composed of various levers, links and joints, looseness or backlash could interfere seriously with accurate response. To insure accuracy of response as initiated by bellows 74 and 77, a tension spring 118 is attached to stud 119 mounted in hole 119a of lever 83 and to stationary spring hinge 120 fixed to frame 80, the action of this spring 118 being such that all joints and levers are controlled by a constant tension so that levers 78 and 83 are constantly applying pressure to stems 76 and 82 at points 79 and 84. Spring 118 resists outward movement of stems 76 and 82 caused by rising temperatures and causes the entire described linkage system to follow stems 76 and 82 as they retract under the influence of lowering temperatures. In addition, tension spring 121, fixed to lever 65 at aperture 121a and to stud 121b fixed to housing 10, provides a constant bias on lever 65, urging it in the same direction as spring 118 to take up any looseness in the pivotal mountings of lever 65.

As heretofore related, the various fluids have differing rates of expansion per degree of temperature change. Therefore, I have provided means whereby the change of ratio caused by movement of friction roller 39 on platform gear 37 can be lesser or greater in response to a fixed increment of movement of stem 76.

Carrier 109, adjustable in a line at right angles to a line passing through the centers of studs 81 and 86 and through studs 111 and 112, determines the position of cross slide 97, which, in turn, positions studs 89 and 96 lengthwise in slots 87 and 88 of levers 78 and 83 and in lever arm relationship to studs 81 and 86, thus changing the ratio of movement between point 79, pivot 81 and stud 89 as well as between point 84, pivot 86 and stud 96, and thus changing the lateral response of studs 89, 96, slide 103, cross slide 97 and stud 113.

Also, as carrier 109 is moved, stud 113 is caused to move lengthwise in slot 114 of lever 65 which varies the lever arm ratio between 116, stud 113 and point 65a and thus varies the response of slide 58 and roller 39 to a fixed movement of stem 76.

Carrier 109 is positioned by manually operated screw 122. Pointer 123 is visually aligned with an appropriate scale 124 mounted in the case 10 of the temperature compensator. Scale 124 is provided with slots 125 and 126 which permit this scale to be adjusted empirically to secure the correct response on the linkage described.

Bellows 77 has an adjusting screw (not shown) attached in fixed relationship thereto so that the entire bellows assembly can be moved axially by turning of nut 128 on the end of the adjusting screw. A notch 129 in the flange of bellows 77 cooperating with pin 131 fixed to the frame 10 locks the bellows 77 against rotating on its axis during adjustment. This entire device can be calibrated by setting carrier 109 at a predetermined position, immersing bulb 72 in a liquid held at exactly 60° F. temperature and adjusting nut 128 and position of bellows 77 and stem 82 until the exact required input to output ratio of 1:1 is obtained.

The total temperature range for any coefficient of expansion of metered liquid is determined by the formula $$T = \frac{\text{Percent}}{100K}$$

in which $T$=total temperature, percent=12 and $K$=coefficient of expansion.

Use of this formula must be modified by the fixed value of the maximum platform setting of $6/16$ (.375) and the total available travel of stem 76. A bellows and bulb assembly was chosen in which for each degree of temperature change in bulb 72, the stem 76 moves .00125 of an inch with a total available travel from this source of .250. The actuating lever 65 has a length of 9.6667 inches from the center of stud 64 to the center of stud 117, and the lever 78 has a length of .7286 from the center of stem 76 to the center of pivot stud 81. The pivot stud is 1.8536 inches from the center line of the friction roller 39. The tabulated figures given is Table I represent: $T$=Total allowable temperature change in degrees Fahrenheit, $R$=Total allowable platform setting in inches, $B$=Total travel of stem 76 in inches, $K$=Coefficient of expansion of liquid being metered, percent=Total percent of change of speed ratio from input to output within the range of this device, and L is the distance from the center of stud 64 to stud 113 in inches.

*Table No. I*

| K | T, ° F. | R | B | L | Percent |
|---|---|---|---|---|---|
| .0003 | 400 | .375 | .500 | 2.3873 | 12 |
| .0004 | 300 | .375 | .375 | 2.5229 | 12 |
| .0005 | 240 | .375 | .300 | 2.6433 | 12 |
| .0006 | 200 | .375 | .250 | 2.7508 | 12 |
| .0007 | 171.43 | .375 | .2142 | 2.8478 | 12 |
| .0008 | 150 | .375 | .1875 | 2.9349 | 12 |
| .0009 | 133.3 | .375 | .1666 | 3.01469 | 12 |
| .0010 | 120 | .375 | .150 | 3.0867 | 12 |
| .0011 | 109.08 | .375 | .1366 | 3.1519 | 12 |
| .0012 | 100 | .375 | .125 | 3.2141 | 12 |
| .0013 | 92.28 | .375 | .1154 | 3.2703 | 12 |
| .0014 | 85.7 | .375 | .1072 | 3.3220 | 12 |
| .0015 | 80 | .375 | .100 | 3.3708 | 12 |
| .0016 | 75 | .375 | .0938 | 3.41536 | 12 |
| .0017 | 70.58 | .375 | .0882 | 3.45796 | 12 |
| .0018 | 66.66 | .375 | .0833 | 3.4970 | 12 |

Thus, with a manual adjustment of screw 122, the distance "L" may be varied to obtain a setting corresponding to the coefficient of expansion of the liquid being metered, and the input to output speed ratio will then automatically be adjusted for changes in the temperature of the liquid within the range of temperature in column "T," to provide a correction to 60° F.

Figs. 6–9 illustrate the combined operation of the bellows 74 and 77 and their cooperating linkage and their effect on the friction roller 39.

Figure 1:
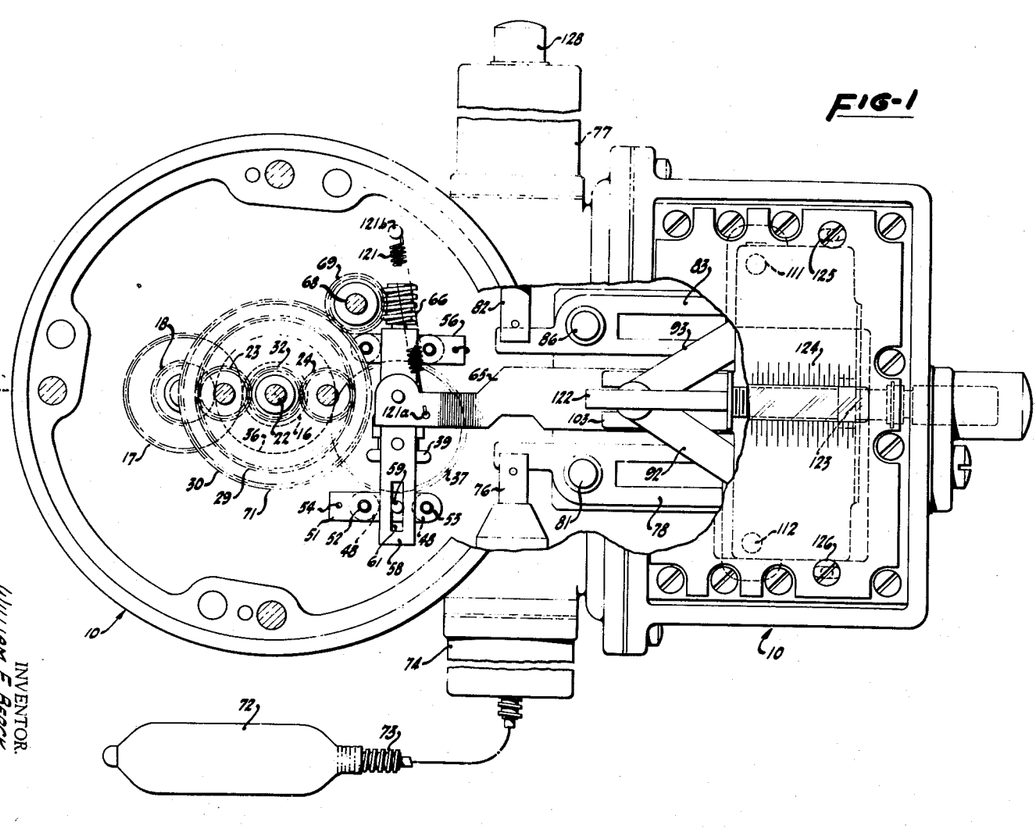
Fig. 1 shows a plan view, with parts broken away, of a preferred embodiment of my invention.
Figures 2, 3:
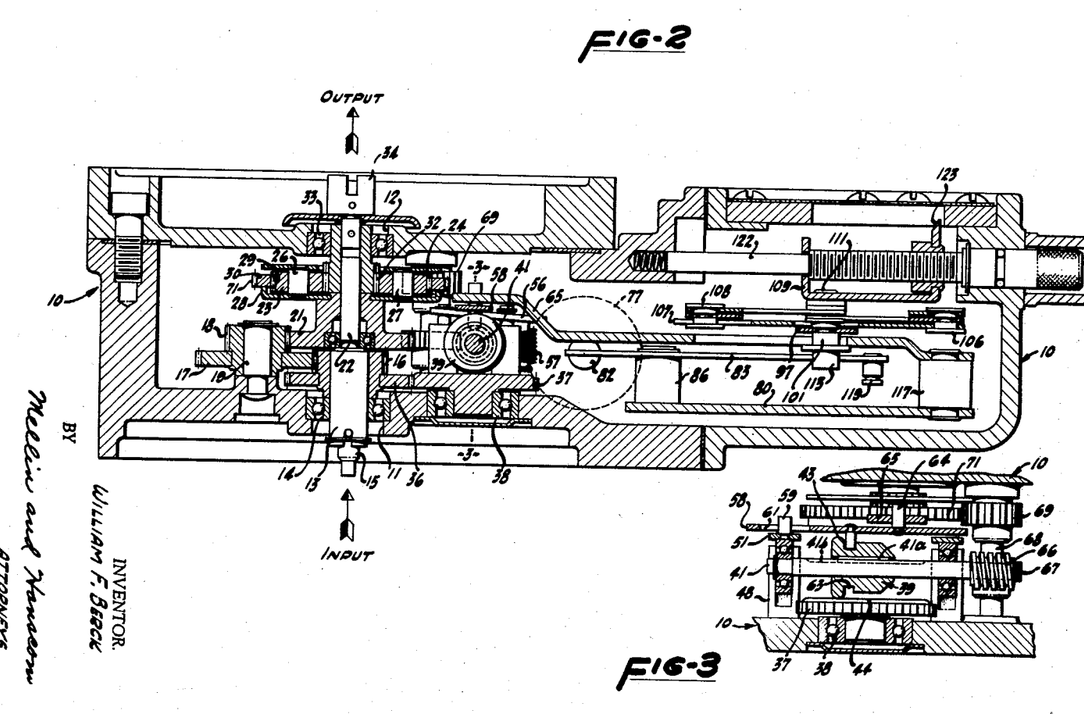
Fig. 2 is an elevational sectional view of the same, taken along line 2—2 of Fig. 1.
Fig. 3 is a partial elevational view of the same, taken along line 3—3 of Fig. 2.
Figure 4:
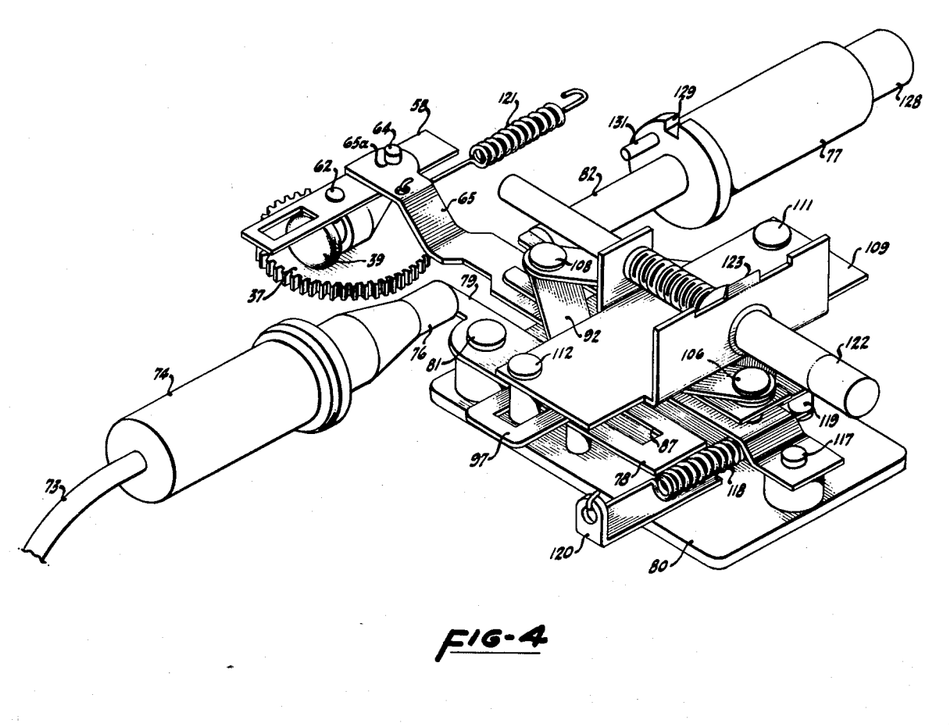
Fig. 4 is a perspective view of the temperature responsive actuator.
Figure 5:
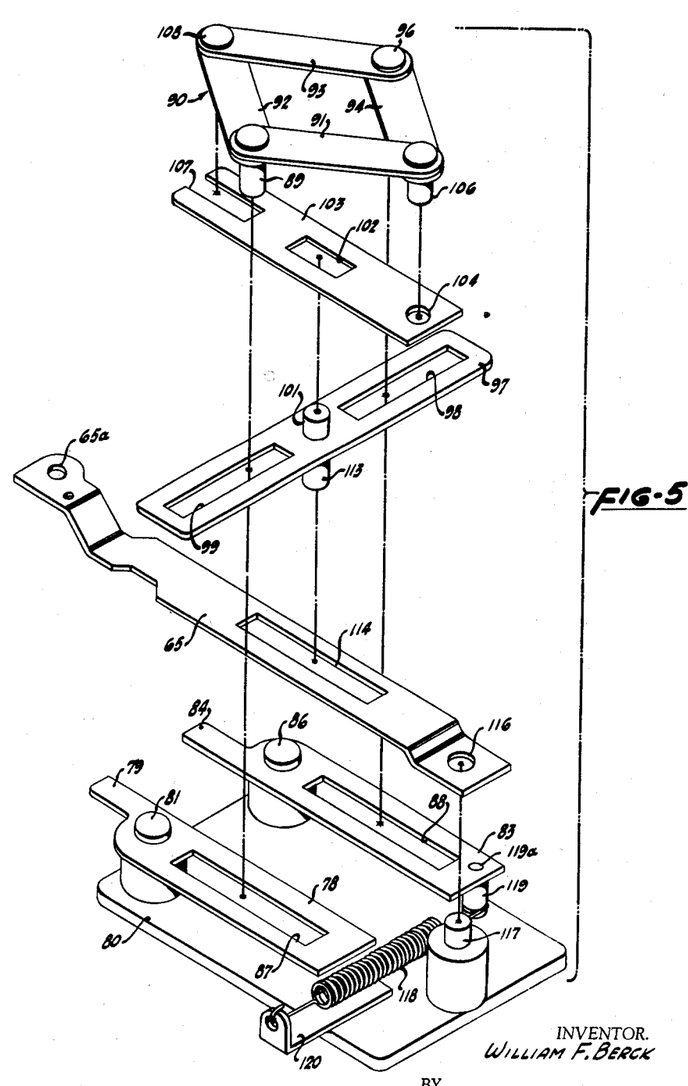
Fig. 5 is an exploded view showing the arrangement of parts in the temperature responsive actuator.
Figure 6:
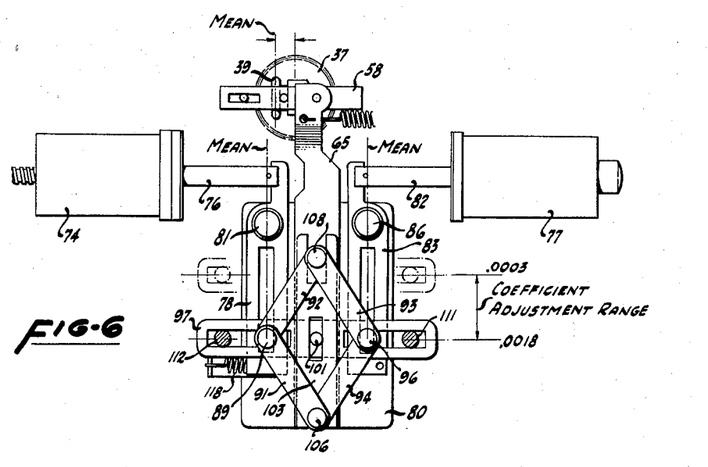
Figs. 6 through 9 illustrate the relative position of the temperature responsive actuator for different conditions.

Fig. 6 illustrates both bellows at a mean position, in which case all of the linkage assumes a mean position, as does the friction roller 39 on platform gear 37. The carrier 109 is set at a coefficient of .0018, and thus the studs 89 and 96 lie in a line parallel to and furtherest from shaft 41 and consequently the line of travel of friction roller 39.

Figure 7:
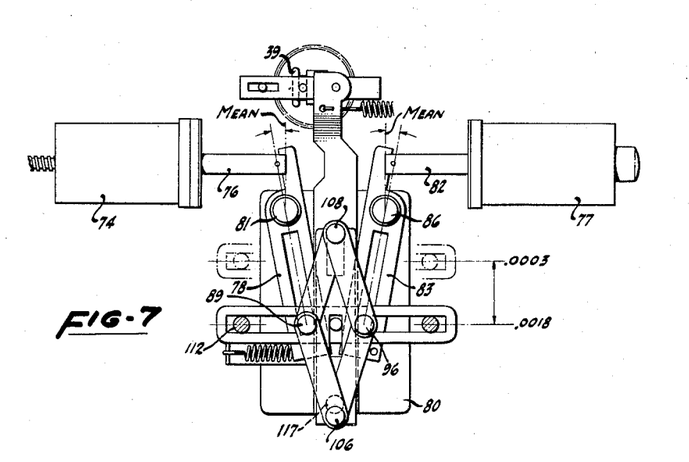

Fig. 7 illustrates the effect of a minus change in ambient temperature. Both bellows 74 and 77 contract moving stems 76 and 82 outwardly in opposite directions and in equal distances. As has been described, the toggle system 90 cancels out the effect of this equal movement of the stem and the mean position of lever 65 and, correspondingly, the mean position of the friction roller 39 on platform gear 37 remains unchanged. Carrier 109 is still set at a coefficient of .0018.

Figure 8:
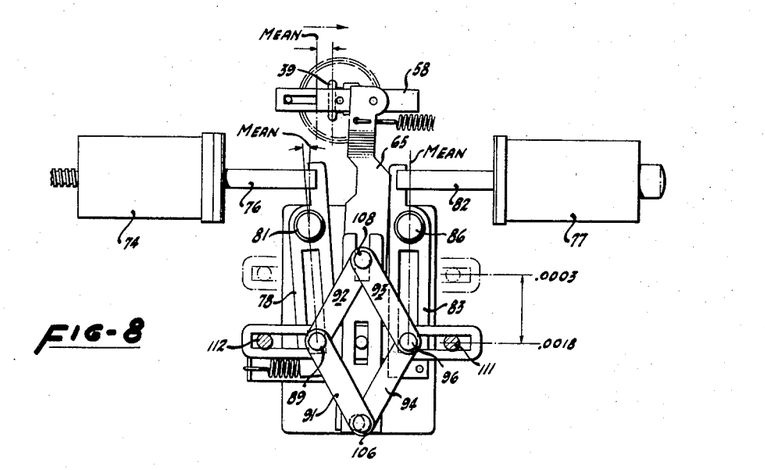

Fig. 8 illustrates bellows 77 and stem 82 at a mean position, as in Fig. 6, but bellows 74 is now affected by a minus change in temperature sensed by bulb 72, and, as a consequence, stem 76 moves outwardly. The lever 78 moves in a counterclockwise direction, forcing stud 89 to the right. Stud 96 is held fixed and thus the studs 106, 108, 101 and 113 move to the right, pivoting the lever 65 clockwise to accomplish a change in position of friction roller 39 on platform gear 37 to provide a compensating change in input to output ratio. Carrier 109 is set at a coefficient of .0018.

Figure 9:
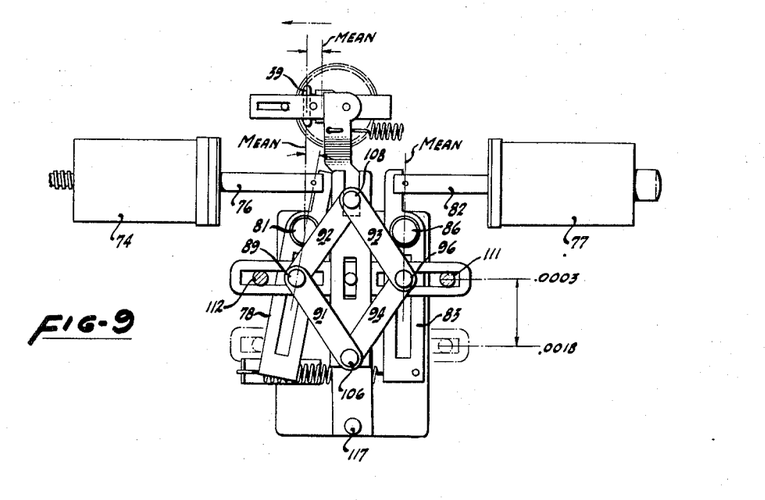

Fig. 9 illustrates bellows 77 and stem 82 at a mean position as in Fig. 6, but bellows 74 is now affected by a plus change in temperature in bulb 72, and as a consequence the linkage has moved laterally and oppositely to that illustrated in Fig. 8 to accomplish a change in position of friction roller 39 on platform gear 37 to provide a compensating change in input to output ratio. Carrier 109 is illustrated as having been set at a coefficient of .0003, so that studs 89 and 96 lie in a line parallel to and closest to shaft 41.

It is to be understood that the form of my invention, herewith shown and described, is to be taken as a preferred example of the same, and that various changes in the shape, size, and arrangement of parts may be resorted to, without departing from the spirit of my invention, or the scope of the attached claims.

Having thus described my invention, what I claim and desire to secure by Letters Patent is:

1. In an automatic temperature compensator, a variable speed transmission comprising an output shaft adapted to be connected to an indicator, a sun gear fixed to said output shaft, a ring gear concentric to said sun gear, a planet gear arm freely mounted concentric to said output shaft for axial rotation thereabout, a planet gear carried by said planet gear arm in meshing engagement with said sun and ring gears, an input shaft adapted to be connected to a liquid meter counter shaft, a drive gear fixed to said input shaft, a first drive means having a fixed drive ratio and drivingly connecting said planet gear arm and said drive gear for positively driving said planet gear arm around said sun gear upon rotation of said input shaft, said drive gear, first drive means, planet and sun gears having an overall drive ratio such that the rotational speed of said output shaft is greater by a predetermined percentage than the rotational speed of said input shaft if said ring gear were held stationary, a platform gear positively driven by said drive gear, a friction wheel mounted for axial movement radially of said platform gear and having a mean position relative thereto, said friction wheel having the periphery thereof in continual frictional engagement with said platform gear, a second drive means positively connecting said friction wheel and said ring gear for rotating said ring gear by said wheel in the same direction as said drive gear rotates said planet gear arm, said drive gear, platform gear, friction wheel, second drive means, ring, planet and sun gears having an overall drive ratio when said friction gear is in its mean position relative to said platform gear such that the output shaft will be rotated by said input shaft in a direction opposite to and at a speed equal to the above mentioned predetermined percentage of input shaft speed if said planet gear arm were to be held stationary, temperature responsive means for measuring the variations in temperature from a predetermined mean temperature of the liquid being metered, and means actuated by said temperature responsive means to axially move said friction wheel radially of said platform gear in both directions from said mean position thereon proportionally to the variations from mean temperature of said liquid measured by said temperature responsive means.

2. An automatic temperature compensator for liquid meters comprising an output shaft adapted to be connected to an indicator, a sun gear fixed to said output shaft, a ring gear concentric to said sun gear, a rotatable planet gear arm mounted concentrically to said output shaft for rotation therearound, a planet gear carried by said planet gear arm in meshing engagement with said sun and ring gears, an input shaft adapted to be connected to a liquid meter counter shaft, a drive gear fixed to said input shaft, a first drive means having a fixed drive ratio and drivingly connecting said planet gear arm and said drive gear for positively driving said planet gear arm around said sun gear upon rotation of said input shaft, said drive gear, first drive means, planet and sun gears having an overall drive ratio such that the rotational speed of said output shaft is greater by a predetermined percentage than the rotational speed of said input shaft if said ring gear were held stationary, a platform gear positively driven by said drive gear, a friction wheel mounted for axial movement radially of said platform gear and having a mean position relative thereto, said friction wheel having the periphery thereof in continual frictional engagement with said platform gear, a second drive means positively connecting said friction wheel and said ring gear for rotating said ring gear by said wheel in the same direction as said drive gear rotates said planet gear arm, said drive gear, platform gear, friction wheel, second drive means, ring, planet and sun gears having an overall drive ratio when said friction gear is in its mean position relative to said platform gear such that the output shaft will be rotated by said input shaft in a direction opposite to and at a speed equal to the above mentioned predetermined percentage of input shaft speed if said planet gear arm were to be held stationary, temperature responsive means for measuring the variations in temperature from a predetermined mean temperature of the liquid being metered, and means actuated by said temperature responsive means for varying the overall drive ratio of said gear train means from the mean value thereof proportionally to the variations from mean temperature of said liquid measured by said temperature responsive means.

References Cited in the file of this patent

UNITED STATES PATENTS

| | | |
|---|---|---|
| 452,444 | Wattles | May 19, 1891 |
| 1,922,882 | Chatfield | Aug. 15, 1933 |
| 2,222,551 | Ziebolz et al. | Nov. 19, 1940 |
| 2,312,105 | Liebrecht | Feb. 23, 1943 |
| 2,438,935 | Marsh | Apr. 6, 1948 |
| 2,460,863 | Weiss | Feb. 8, 1949 |
| 2,545,152 | Haidegger | Mar. 13, 1951 |
| 2,570,410 | Vetter | Oct. 9, 1951 |